Jan. 29, 1963 W. R. LOWE 3,075,802
SEALING CONSTRUCTION FOR TRUCKS, TRAILERS AND THE LIKE
Filed April 7, 1961 2 Sheets-Sheet 2
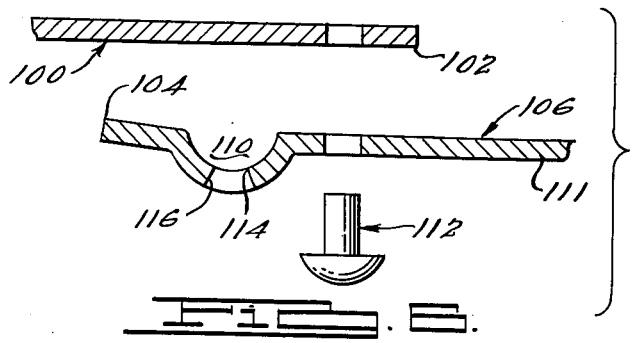
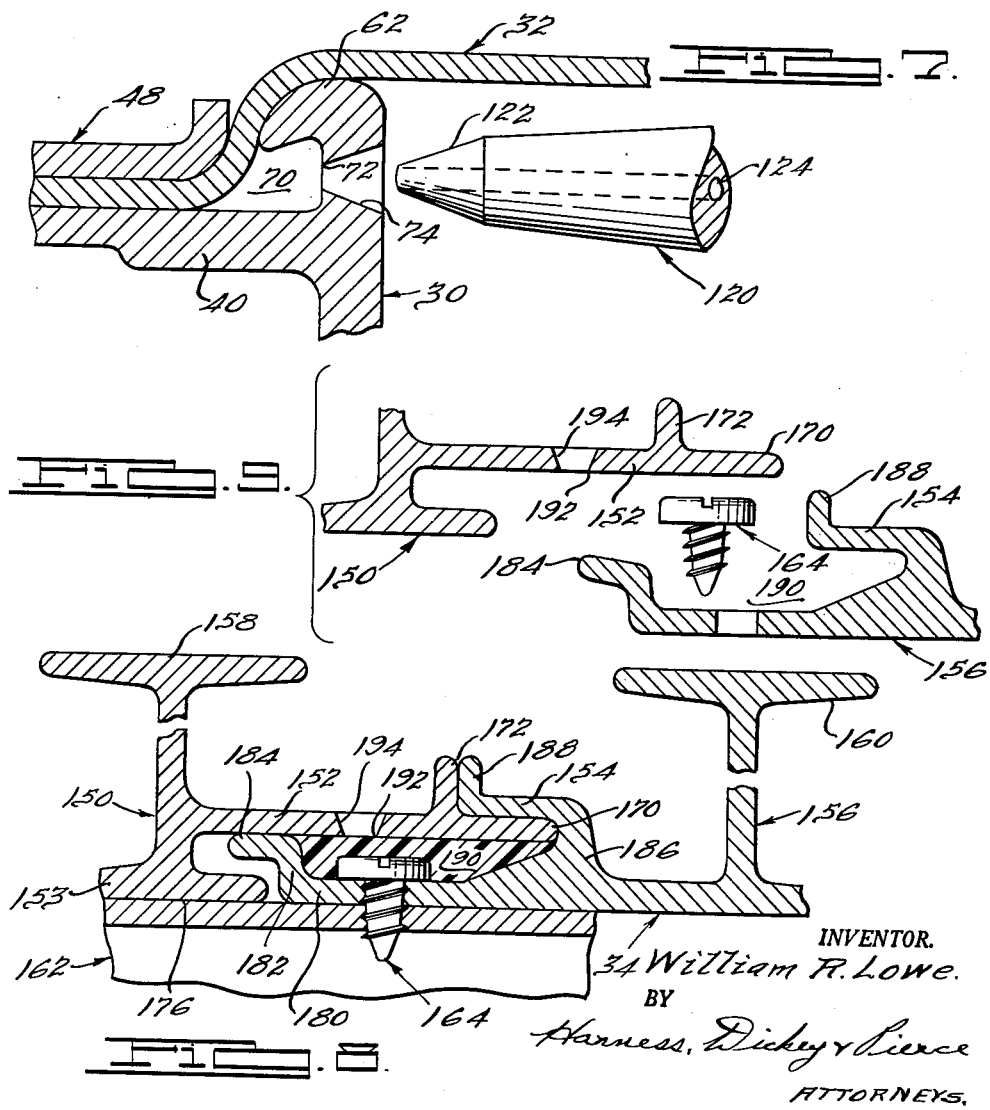
INVENTOR.
William R. Lowe.
BY
Harness, Dickey & Pierce
ATTORNEYS.

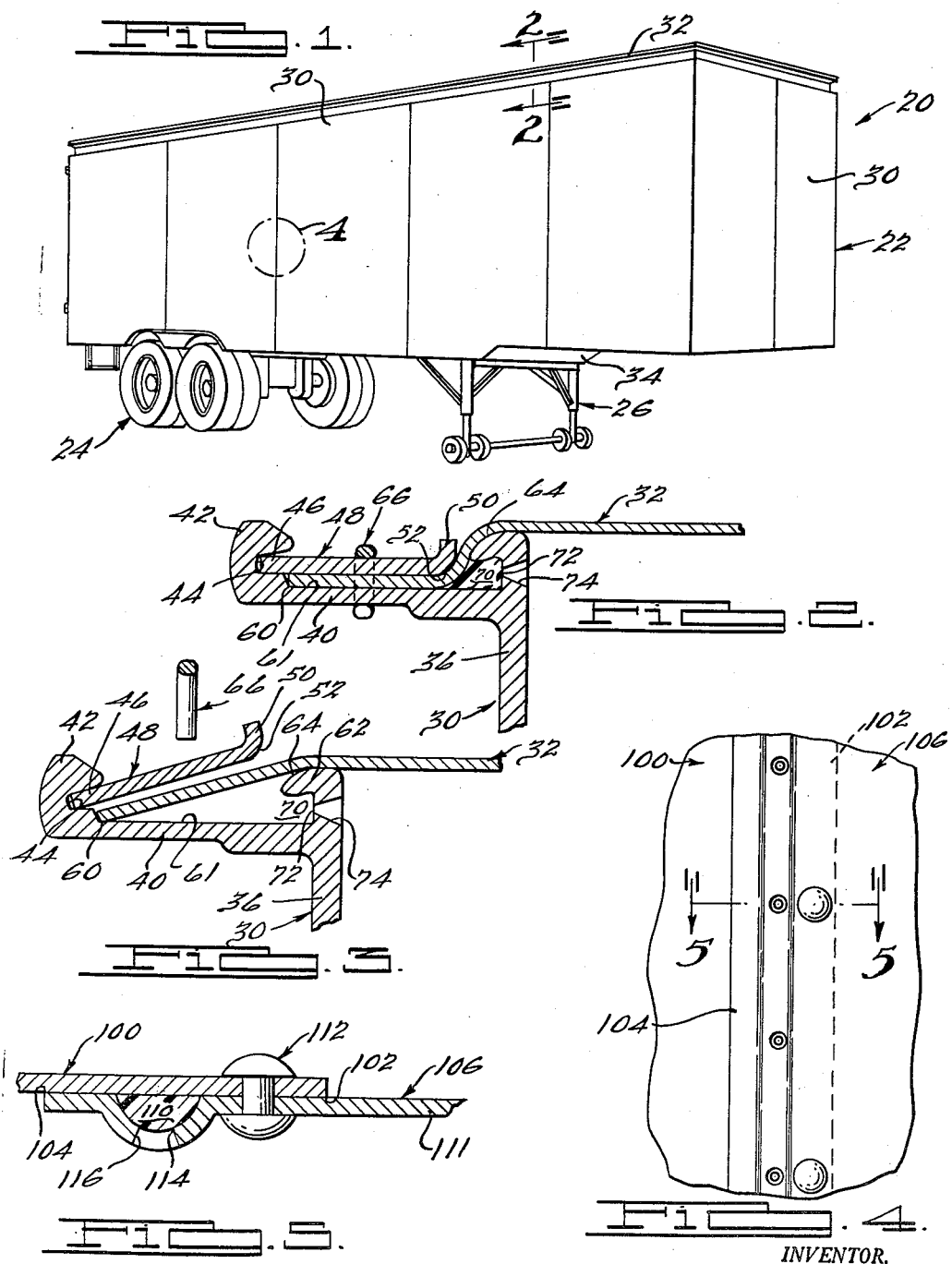

United States Patent Office 3,075,802
Patented Jan. 29, 1963

3,075,802
SEALING CONSTRUCTION FOR TRUCKS,
TRAILERS AND THE LIKE
William R. Lowe, Upland, Calif., assignor to Fruehauf
Trailer Company, Detroit, Mich., a corporation of
Michigan
Filed Apr. 7, 1961, Ser. No. 101,459
2 Claims. (Cl. 296—29)

This invention relates to an improved, sealed construction for van-type truck and trailer bodies.

Goods transported by truck or highway trailer frequently are damaged by rain or road splash and dirt which enters the body of the vehicle through the joints between adjacent skin panels or floor panels and between the panels and their supporting structural members. All current van-type truck and trailer bodies have this problem as the construction conventionally used simply does not provide a dirt and water-tight structure. Also, a weather-tight and dustproof construction is important in the case of refrigerated trailers in order to maintain efficient insulation of the trailer walls and to keep the insulating material dry and clean.

An important object of the invention is to provide a novel construction for van-type truck and trailer bodies in which all of the exposed joints are effectively sealed to assure a weather-tight and dustproof structure.

Another object of the invention is to provide a truck and trailer body construction in which all of the joints between the skin and floor panels and between the panels and the supporting structural members are uniquely formed to receive and retain sealing material.

Still another object of the invention is to provide a truck and trailer body construction of the above-mentioned character in which the seal joints are uniquely prestressed to assure a tight initial closure for the sealing material without requiring a precision finish or closer tolerances than ordinarily are used for the parts forming the joints and to maintain the sealed joints tight under conditions of flexure and vibration normally encountered in use.

Yet another object of the invention is to provide a seal joint of the above type having the above-recited characteristics and advantages that can be incorporated in the trailer without adding appreciably to the manufacturing cost.

Other objects and advantages of the present invention will become apparent from the following descriptions, claims and drawings wherein:

FIGURE 1 is a perspective view of a semi-trailer;

FIG. 2 is a cross sectional view taken substantially along the line 2—2 of FIGURE 1;

FIG. 3 is a cross sectional view similar to FIG. 2, prior to assembly;

FIG. 4 is an enlarged view of the area within the circle 4 of FIGURE 1;

FIG. 5 is a cross sectional view taken substantially along the line 5—5 of FIG. 4;

FIG. 6 is a cross sectional view similar to FIG. 5, prior to assembly;

FIG. 7 is an enlarged cross sectional view similar to FIG. 2 showing the nozzle of a sealing compound applicator in alignment with the inlet orifice in a wall component;

FIG. 8 is a cross sectional view of an exemplary floor construction of the trailer of FIGURE 1; and FIG. 9 is a cross sectional view similar to FIG. 8 shown prior to assembly.

The sealing construction of the present invention utilizes a flowable sealing compound, for example, a viscous rubber or plastic base sealing compound that is injected between two adjoining and overlapping structural members or panels of the trailer van. The sealing compound is accommodated in a recess formed in one of the members and retained therein by the overlapping portion of the other member. One particularly important feature is that the member overlaying the compound receiving recess is biased into line contact with the member having the recess on each side of the recess. Also, because of the novel configuration of the overlapping members, only a single row of rivets, staples, screws or the like is required to maintain the aforementioned spaced line contact between the members.

A plurality of spaced inlet orifices are provided in the overlapping portion of one of the adjoining members in communication with the recess therebetween to provide for the injection of the sealing compound into the recess after assembly. A conical seat is provided around each orifice for the reception of the nozzle of a sealing gun having a complementary conical taper, the orientation of the inlet orifices facilitating such injection. The inlet orifices are spaced longitudinally of the compound receiving recess so that sealing compound flows longitudinally of the recess to effect a continuous seal.

More particularly, an exemplary embodiment of the present invention is shown in association with a conventional highway trailer 20. The trailer 20 has a closed van 22 that is supported by a conventional suspension system 24 and forward prop 26. The trailer 20 is provided with a conventional coupling means (not shown) for attachment to the fifth wheel of a conventional truck-tractor (not shown).

The trailer van 22 comprises rectangularly arranged vertical side and end walls 30, a top 32 (FIGURES 2 and 3) and a bottom 34 (FIGURES 8 and 9) each of which comprises a plurality of adjoining panels that are joined and sealed in accordance with the present invention. It is to be understood that one form of the present invention is applicable to each juncture of the adjacent panels comprising the van 22. Generally, each juncture can be described as either a juncture of panels laying in substantially the same plane, or as a juncture of panels that are normally related to one another. An exemplary embodiment of the invention as applied to the junctures normally utilized in trucks, trailers or the like will be more particularly described hereinafter. Normally, the side, end, roof and floor panels of such a trailer are reinforced by relatively rigid structural members, the particular configuration of which forms no part of the present invention except when the juncture of such a member with a panel forms a joint that must be sealed against the infiltration of rain and foreign materials. This condition is found, for example, at corners and along the upper and lower terminal edges of the van whereat suitable corner posts and rails connect the side, end, roof and floor panels, respectively.

Referring now to FIGURES 2 and 3, a sealing construction in accordance with one embodiment of the present invention is shown for the juncture of a horizontal top panel 32 with a rail portion 36 of a normally related vertically extending side panel 30. It is to be understood that this embodiment of the invention is exemplary of a sealing construction for the juncture of normally related panels wherever they may be utilized in the trailer construction.

The rail 36 has a horizontally extending flange 40 with a reentrantly directed outer end portion 42 that defines a recess 44 for the acceptance of an outer edge portion 46 of a retainer member 48. An inner edge portion 50 of the retainer member 48 is folded upwardly into a terminal flange for the purpose of providing an arcuate pressure ridge 52 on the lower inner edge of the retainer 48 and for the purpose of reinforcing the retainer member 48.

An outer edge portion 60 of the top panel 32 is interposed between the retainer member 48 and the horizontal flange 40 of the rail 36 and is seated in a recess 61 in the flange 40.

As best seen in FIGURE 3, the outer edge portion 60 of the panel 32 is initially superimposed over an upstanding rib 62 on the rail 36 and thereafter is drawn downwardly over an arcuate upper end face 64 on the rib 62 by the retainer member 48. The retainer member 48 is baised downwardly, as by clamps (not shown) and held in the position shown in FIG. 2 by a plurality of staples 66 that are spaced longitudinally of the retainer 48 and which extend through the retainer 48, the outer edge 60 of the top panel 32 and the flange 40 of the side wall of the rail 36.

In accordance with the present invention the upwardly extending rib 62 on the rail 36 is undercut to define a recess or channel 70 for the acceptance of a suitable sealing compound. The sealing compound is preferably a rubber or plastic based mastic that is initially flowable thereafter solidifying into a resilient mass, for example, a Thiokol resin.

The rib portion 62 of the rail 36 is provided with a plurality of longitudinally spaced orifices 72, each of which has a conical seat 74 to facilitate injection of the sealing compound into the recess 70. The sealing compound is maintained in the recess 70 by the pressurized line engagement of the roof panel 32 with the arcuate section 64 of the rib 62 and the edge 60 in the recess 61 of the flange 40. The panel 32 spans the arcuate section 64 and recess 61, the panel 32 being biased thereagainst by the arcuate section 52 of the retainer 48. It is to be noted that only a single staple 66 is required to maintain the aforementioned bias.

Referring now to FIGURES 4, 5 and 6, a sealing construction in accordance with the present invention is applied to the juncture of a pair of panels that lie in substantially the same plane. It is to be understood that such a sealing construction is applicable to any portion of the van 22 where adjacent panels lie in substantially the same plane.

A panel 100 having an edge portion 102 is disposed in overlapping relationship with an edge portion 104 of an adjacent panel 106. The panel 106 is provided with a hollow recess or channel 110 extending the length of and generally parallel to the edge portion 104 thereof for the acceptance of the sealing compound. As best seen in FIG. 6, the edge portion 104 of the panel 106 is preferably initially angularly related to a main portion 111 thereof so that when the edge portions 102 and 104 are drawn together, as by a rivet 112, the edge portion 102 contacts the edge portion 104 in spaced line engagement or contact on opposite sides of the recess 110. Upon drawing of the edge portions 102 and 104 together, the edge portion 104 is biased to the position shown in FIG. 5 and held in this position as by the rivet 112. It is to be noted that only one row of rivets is required to maintain the aforementioned spaced line contact that flexibly holds the sealing compound within the recess 110. The sealing compound is injected into the recess 110 through a plurality of aligned inlet orifices 114, each of which has a conical seat 116 for the acceptance of a complementary nozzle on an applicator.

Referring now to FIG. 7, an applicator 120 having a conical end portion 122 complementary to the seats 74 and 116 of the aforementioned orifices 72 and 114 in the rail 36 and panel 106, respectively, is shown in alignment with the orifice 72. The applicator 120 has a central bore 124 for the passage of the sealing compound therethrough into the recess 70. The tapered portion 122 provides for a sealing fit in the seat 74 during injection of the sealing compound and both locates the nozzle and precludes loss of the sealing compound.

Referring to FIGS. 8 and 9, a sealing construction in accordance with yet another embodiment of the present invention is shown for the juncture of, for example, adjoining floor panels 150 and 156.

The floor panel 150 has a flange 152 spaced upwardly from a generally planar portion 153 thereof for engagement with a complementary upper flange 154 on the adjacent floor panel 156. The panels 150 and 156 may be provided with upstanding generally T-shaped ribs 158 and 160, respectively, for the support of conventional floorboards (not shown). The panels 150 and 156 are supported by suitable transverse members 162, which may be, for example, the structural or frame members of the trailer 20. The panels 150 and 156 are secured to the frame members 162 as by a plurality of self-threading metal screws 164.

In accordance with the present invention, the flange 152 of the panel 150 has a horizontally extending terminal edge portion 170 with a vertically extending rib 172 thereon. The flange 152 and terminal edge portion 170 thereof are spaced upwardly from the planar portion 153 of the panel 150 for the acceptance of a complementary lower flange 180 on the floor panel 156. The flange 180 of the panel 156 has a vertically standing rib 182 and a horizontally extending terminal edge portion 184 that engages the underside of the horizontally extending flange 152 of the panel 150. The lower flange 180 has an upwardly extending rib portion 186 spaced inwardly from the rib 182 thereon for the support of the upper flange 154. The flange 154 has an upwardly extending rib 188 thereon for engagement in abutting relationship with the rib 172 on the terminal edge portion 170 of the panel 150 thereby to position and align the panels 150 and 156 with respect to one another. It is to be noted that the terminal edge portion 170 of the panel 150 is accepted under the upper flange 154 of the panel 156.

It is to be noted that a recess 190 is defined by the superimposed flanges 152 and 180 of the panels 150 and 156, respectively. The terminal flange 152 of the panel 150 is provided with a plurality of spaced and aligned orifices 192 having conical seats 194 thereon for the acceptance of the nozzle portion 122 of the compound applicator 120 thereby to facilitate injection of the sealing compound into the recess 140. The sealing compound is positively held in the recess 190 by engagement of the panels 150 and 156 at two spaced apart lines or ridges defined by engagement of the terminal edge portion 184 of the panel 156 with the underside of the flange 152 of the panel 150 and by engagement of the terminal edge portion 170 of the panel 150 with the underside of the upper flange 154 on the panel 156. Utilizing this construction, only a single row of screws 164 is required to hold down the panel 156 and adjoining panel 150 thereby to define the longitudinal recess 190 for the acceptance of the sealing compound.

From the foregoing description, it should be apparent that the sealing construction of the present invention provides for the positive sealing of an enclosure against the infiltration of water and foreign materials. The construction in each embodiment comprises a first panel having a terminal edge portion having means defining a recess extending generally parallel thereto. A second panel has a terminal edge portion overlapping the recess in the first panel and is engageable with the first panel on each side of the recess therein. A single row of screws, rivets or the like draws the edge portions of the first and second panels into engagement. A sealing compound is then injected into the recess to effect the seal. In practice, sufficient sealing compound is injected into an orifice until flowage thereof along the recess is visible at the next adjacent orifice. In this manner, successive injections insure that a continuous mass of sealing compound is disposed between adjoining panels.

It is to be understood that the specific constructions of the improved sealing construction herein disclosed and described are presented for the purpose of explanation and illustration and are not intended to indicate

What is claimed is:

1. A sealing construction for sealing adjoining panels of a van-type body of a truck against the infiltration of water and foreign materials, said construction comprising a first panel having a terminal edge portion with an undercut portion thereon defining a recess, said first panel having a flange spaced from the terminal edge portion on the opposite side of the recess from the terminal edge portion thereof, a second panel having a terminal edge portion overlapping the recess in said first panel and engageable with the terminal edge and flange portions of said first panel, means for drawing said second panel into engagement with the terminal edge and flange portions of said first panel to close the recess therein, and means for injecting a sealing compound into the recess in said first panel comprising a plurality of spaced apertures in said first panel communicating with the recess therein.

2. A sealing construction for sealing adjoining panels of a van-type body of a motor vehicle against the infiltration of water and foreign materials, said construction comprising a first panel having a terminal edge portion with an undercut portion thereon defining a recess, said first panel having a normally extending flange with a reentrantly directed end portion, a second panel having a terminal edge portion overlapping the recess in said first panel and engageable with the terminal edge and flange portions of said first panel, a retainer plate engageable in the reentrantly folded portion of the flange on said first panel and with said second panel for drawing said second panel into engagement with the terminal edge and flange portions of said first panel to close the recess therein, and means for injecting a sealing compound into the recess comprising a plurality of spaced apertures in said first panel communicating with the recess therein.

References Cited in the file of this patent

UNITED STATES PATENTS

| | | |
|---|---|---|
| 1,155,717 | Fouts | Oct. 5, 1915 |
| 2,266,702 | Byers | Dec. 16, 1941 |
| 2,566,282 | Bradley et al. | Aug. 28, 1951 |
| 2,698,269 | Sussenbach | Dec. 28, 1954 |
| 2,751,109 | Moore | June 19, 1956 |
| 2,842,074 | Hess et al. | July 8, 1958 |

FOREIGN PATENTS

| | | |
|---|---|---|
| 602,715 | Great Britain | June 1, 1948 |